T. R. McKNIGHT.
DUMP CAR.
APPLICATION FILED MAR. 17, 1911.
1,064,845. Patented June 17, 1913.
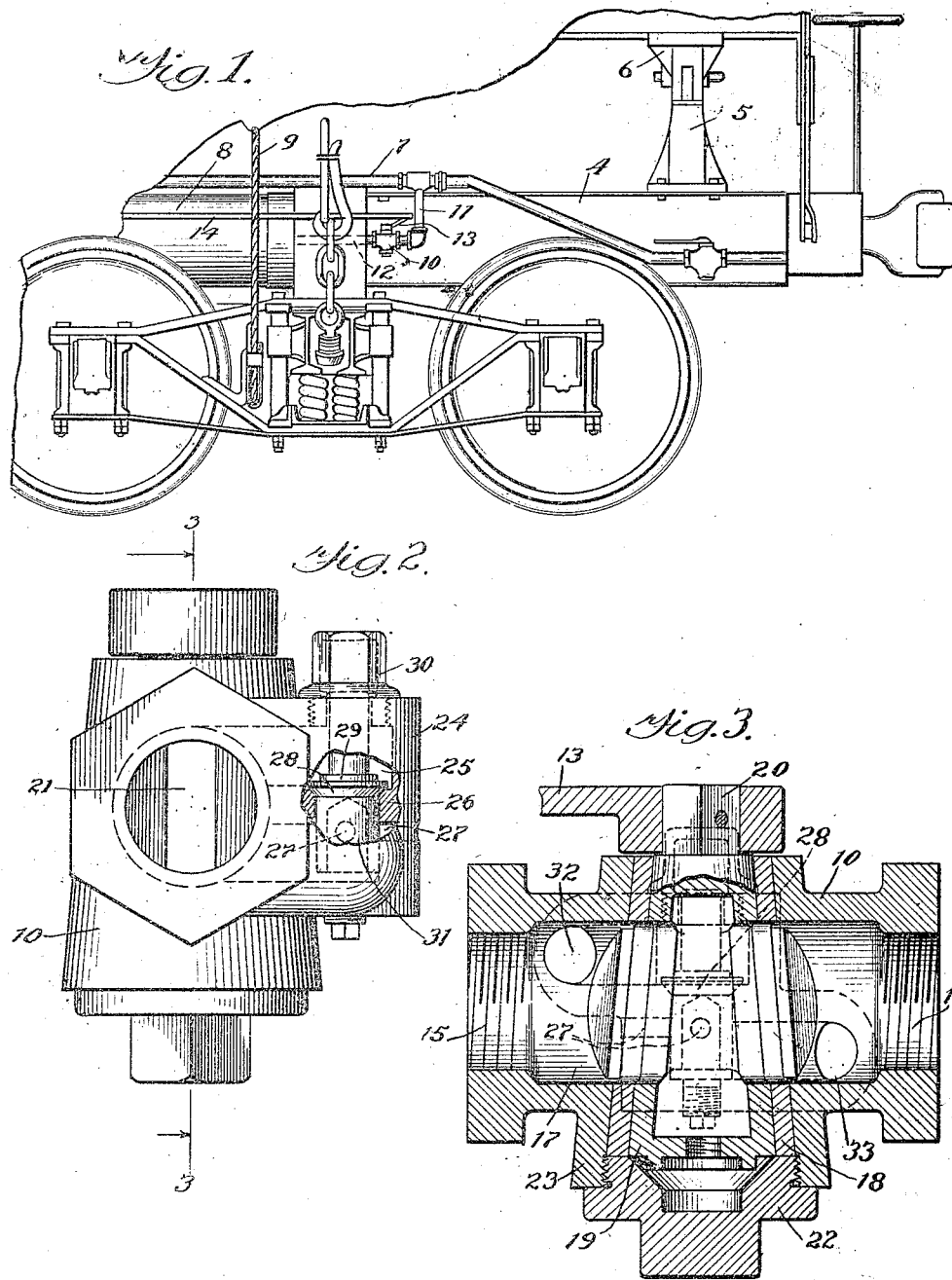

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

1,064,845.  Specification of Letters Patent.  Patented June 17, 1913.

Application filed March 17, 1911. Serial No. 615,061.

*To all whom it may concern:*

Be it known that I, THOMAS R. MC-KNIGHT, a citizen of the United States, residing at Aurora, in the county of Kane and State of Illinois, have invented certain new and useful Improvements in Dump-Cars, of which the following is a specification, reference being had to the accompanying drawings.

My invention relates to dump cars, and has particularly to do with dump cars provided with air-operated mechanism for dumping the load and for restoring the car bed or box to its normal position. An example of this type of dump car is illustrated and described in Letters Patent of the United States No. 920,616, granted to me May 4, 1909, in which the dumping of the load and also the restoration of the car bed to its normal position are effected by the engineer in the cab through the instrumentality of train-pipes supplied with compressed air from any suitable source, the air pressure in said pipes being controlled by the engineer's valve in the cab in such manner that he may admit compressed air to either train-pipe at pleasure or exhaust it therefrom. For dumping the load of the several cars at one side of the train, air is admitted to the train-pipe at that side and through such train-pipe is supplied to cylinders on the several cars. These cylinders are provided with suitable pistons and connected mechanism which, when air is admitted to such cylinders, operates to pull down on one side of the car and cause it to tilt and discharge its load. When the cars are to be restored to operative position, compressed air is admitted to the train-pipe at the opposite side and operates through similar mechanism to pull down on the opposite sides of the several cars and thereby swing back the car beds to their horizontal position. It is obvious that owing to the unequal loading of the different cars of a train and to the variation in the position of the loads of the several cars some cars will dump more easily than others and consequently the easier dumping cars will require less power so that the pressure in the several car cylinders will vary. It is also obvious that when restoring these several car beds to their operative position as above described the air in the cylinders at the dumping side of the train must be exhausted as the restoring operation takes place, and in such dump car systems as heretofore used the construction has been such that the compressed air so exhausted from the cylinders at the dumping side has had to escape through the engineer's valve. This arrangement is objectionable owing to the fact that as above suggested the pressure in the several cylinders is unequal, being high in some cylinders and low in others, and consequently where all cylinders exhaust into a common train-pipe the exhaust is not as free as is desirable and the restoration of the cars cannot be as economically and efficiently effected as would be the case if the several cylinders exhausted directly into the open air.

The object of my present invention is to provide an improved construction by which this exhausting of the cylinders into the open air is provided for, thus making the restoration of any car bed to its normal position independent of the action of any other car in the train. I accomplish this object as illustrated in the drawings and as hereinafter described.

What I regard as new is set forth in the claims.

In the accompanying drawings, in which I have illustrated only so much of a car as is necessary to a clear understanding of my invention,—Figure 1 is a partial side elevation of a dump-car; Fig. 2 is an end view of one of the air valves by which the admission of air to the car cylinder from the train-pipe and its exhaustion therefrom are controlled,—some parts being broken away; and Fig. 3 is a longitudinal vertical section on line 3—3 of Fig. 2.

Referring to the drawings,—4 indicates a part of the draft-rigging of a car, which also supports the car body, 5—6 indicating the upper and lower members, respectively, of one of the pivotal supports on which the car bed is carried so that it may rock transversely of the car to dump its load at either side thereof.

7 indicates one of the train-pipes, which is composed of a number of sections carried by the several cars and connected together in series and to the engineer's valve in the cab, as hereinbefore described. These parts are fully illustrated and described in my said Patent No. 920,616 and need not be further shown and described herein, as, separately, they form no part of my present invention.

8 indicates one of the dumping cylinders, which, through suitable intermediate mechanism, operates a cable or rope 9, the upper end of which is connected to one side of the car bed so that by pulling down on said cable the bed is tilted to dump the load.

10 indicates the controlling valve by which the admission of air through the train-pipe to the cylinder 8 is controlled and which also controls the exhaustion of the air from said cylinder. The valve 10 is connected by a pipe 11 with the train-pipe 7 and by a pipe 12 with the cylinder 8.

13 indicates a lever for operating the valve 10, and 14 a connecting-rod by which said lever is actuated to open or close said valve in the manner described in my said patent.

The construction of the valve 10 is best shown in Figs. 2 and 3. As therein shown, 15 indicates the inlet end of the valve and 16 the outlet end or the end which communicates with the pipe 12. 17 indicates a passage extending directly through the valve body from the inlet 15 to the outlet 16, forming a main passageway therethrough which air is admitted to the cylinder 8 when the car bed is to be dumped. 18 indicates a conical bushing, which is fitted centrally in the body of the valve and forms a bearing for the valve-plug 19, which is also tapered and fits in the bushing so as to rotate therein in the ordinary way. At one end the valve 19 is provided with a square projection 20 to receive the lever 13 by which the key is rotated to open or close the main passage through the valve. As shown in Fig. 2, the valve 19 is provided with a slit 21 which, when the valve is open, registers with the main passageway and when the valve is closed extends transversely thereof. 22 indicates a screw-cap fitted in a projecting portion 23 of the valve body so as to inclose the lower end of the bushing. When access to the valve and bushing are desired, the cap 22 may be removed. 24 indicates a boss or lateral extension of the valve body, which contains a check-valve chamber 25 and a valve-seat 26. The boss 24 also is provided below the valve-seat 26 with one or more exhaust passages 27, as shown in Fig. 2. 28 indicates a check-valve which is fitted in the chamber 25 and is adapted to rest on the seat 26, said check-valve having an upwardly-projecting stem 29 fitted in a suitable bearing in a screw-cap 30 which fits in the upper portion of the boss 21, as shown in Fig. 2, and is also provided with a downwardly-projecting stem or barrel 31 which fits closely in that portion of the check-valve chamber 25 below the seat 26,—the arrangement being such that when the valve 28 is on its seat the barrel 31 closely fits in the lower portion of the check-valve chamber 25 and closes the ports 27. The length of the barrel 31 is such that it does not extend to the bottom of the check-valve chamber 25, a space being left which serves to admit air from the outlet end 16 of the valve 10, as hereinafter described. 32 indicates a by-pass which leads from the inlet end of the valve 10 to the upper portion of the check-valve chamber 25, and 33 indicates a by-pass which leads from the outlet end of the valve 10 to the lower portion of the check-valve chamber 25, as shown in Fig. 3, so as to admit air from the cylinder to the lower portion of said check-valve chamber below the barrel 31 of the check-valve 28. The purpose of this arrangement is to permit pressure of the air in the cylinder 8 to raise the valve 28, under certain conditions, so as to carry the barrel 31 up above the ports 27 and permit the air in the cylinder 8 to exhaust through said ports, as hereinafter described.

The operation is as follows: When the car is in its normal position the valve 10 is open so that when the car is to be dumped and air is admitted by the engineer to the train-pipe 7 for that purpose, air pressure is supplied through pipe 11, valve 10 and pipe 12 to the cylinder. At this time downward pressure is applied to the check-valve 28 by the air in the train-pipe through by-pass 32, tending to hold said valve closely down upon its seat. While at the same time air under the same pressure as the air in the cylinder 8 is admitted to the lower portion of the check-valve chamber 25 through by-pass 33, and such pressure tends to lift the barrel 31, as such barrel is of less diameter than the check-valve the downward pressure upon the check-valve is greater and the valve is not lifted from its seat. When the valve 28 is on its seat the barrel 31 serves to close the exhaust ports 27 so that the escape of air through said ports is at that time prevented. When the dumping operation is completed the valve-plug 19 is automatically turned to its closed position by suitable mechanism, such, for example, as that described in my said patent, thereby cutting off the cylinder 8 from communication with the train-pipe 7, and the engineer by means of his valve connects the train-pipe 7 with the main exhaust so as to relieve said pipe from pressure. This also relieves the check-valve 28 from downward pressure so that the pressure of the air in the cylinder 8 operates to lift said check-valve and expose the outlet ports 27, thereby permitting the air in the cylinder 8 to escape into the open air while the car bed is being restored to its operative position by the action of the cylinder at the opposite side of the car, as hereinbefore described.

I wish it to be understood that while I consider the construction shown and described as being the best device as yet devised for the purpose of exhausting the dumping cylinders into the open air, my invention is not restricted to such specific construction but is generic in character, and the claims are therefore to be construed accordingly.

By the term "dumping mechanism" as employed in the claims it is intended to comprehend either compressed-air-actuated mechanism for tilting the car bed to discharge its load or for tilting it in the opposite direction after dumping to restore it to its normal position.

While my improved valve is intended primarily for use in connection with dump-cars, it may be used for any other purpose for which it is adapted.

That which I claim as my invention, and desire to secure by Letters Patent, is,—

1. A dump-car having compressed-air-operated dumping mechanism comprising a cylinder and an inlet-valve for admitting compressed-air thereto, said valve having means operated by back-pressure of the compressed-air in the cylinder after the closure of the inlet-valve and independently thereof for permitting the compressed-air in the cylinder to be exhausted into the atmosphere.

2. A dump-car having compressed-air-operated dumping mechanism, comprising an inlet valve for compressed air, said valve having a check-valve operating after the closure of the inlet valve to permit the compressed air to be exhausted into the atmosphere.

3. A dump-car having compressed-air-operated dumping mechanism, means for admitting compressed air thereto for actuating the same and for shutting off the compressed air supply, and means operated by back-pressure for exhausting the compressed air from said dumping mechanism into the atmosphere.

4. In a dump-car system, comprising a plurality of cars equipped with compressed-air-operated dumping mechanism, the combination with a train-pipe for supplying compressed air to the dumping mechanism of said cars, of means operated by back-pressure when the train-pipe pressure is cut off for separately exhausting the compressed air from the dumping mechanism of the several cars into the atmosphere.

THOMAS R. McKNIGHT.

Witnesses:
H. D. HAMPER,
R. L. RUBLE.